W. S. DEEDS.
Kettle for Melting Metals.
No. 105,553. Patented July 19, 1870.
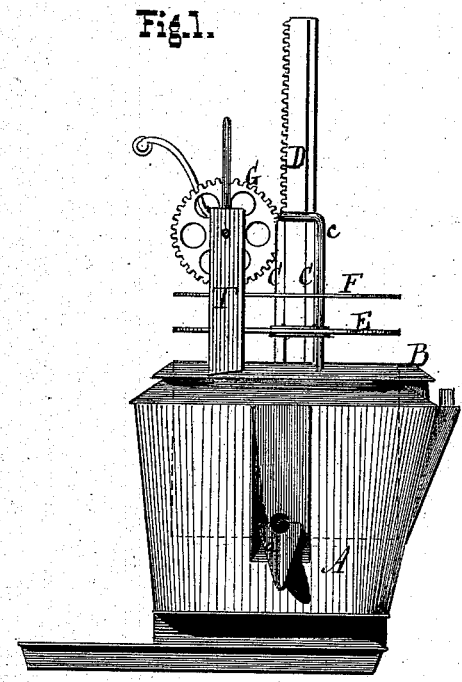
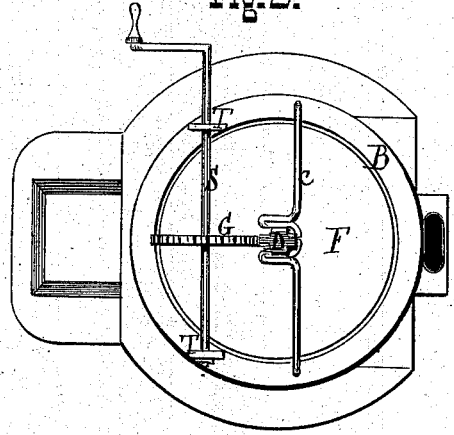
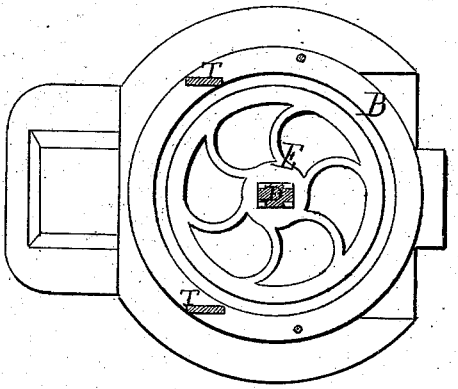
Witnesses.
August Bastert
Jno. Shmier
Inventor.
William S. Deeds,
by T. E. Theaker
Attorney.

United States Patent Office.

WILLIAM S. DEEDS, OF BALTIMORE, MARYLAND, ASSIGNOR TO HIMSELF, JOHN H. BAER AND GEORGE KOCH, OF SAME PLACE.

Letters Patent No. 105,553, dated July 19, 1870.

IMPROVEMENT IN KETTLE FOR MELTING, MIXING, AND CASTING METALS.

The Schedule referred to in these Letters Patent and making part of the same.

*To all whom it may concern:*

Be it known that I, WILLIAM S. DEEDS, of Baltimore, in the county of Baltimore and State of Maryland, have invented a new and useful Kettle for Melting, Mixing, and Casting Metals; and I do hereby declare that the following is a full, clear, and exact description thereof, sufficient to enable those skilled in the art to which my invention appertains to make and use the same, reference being had to the accompanying drawing making part of this specification, and to the letters and figures marked thereon.

The nature of my invention consists in a kettle for melting, mixing, and casting metals, provided with a closely-fitting cover or follower, for the exclusion of atmospheric air from the kettle; also, providing the kettle with a stirring apparatus, by means of which the liquid metal can be stirred and thoroughly mixed without exposure to the atmosphere; also, so arranging the kettle with relation to the furnace that the metal can be drawn off from the bottom.

In the accompanying drawing—

Figure 1 is a side elevation of my improvement.

Figure 2 is a top view, with the cover or follower in place.

Figure 3 is a top view, partly in section, with the cover or follower removed.

The furnace, A, may be of any suitable form, and constructed of any suitable material. On one side is a spout, a, at the upper end of which is an opening, corresponding with a similar opening near the bottom of the kettle.

The kettle, B, is cylindrical in form, on the inside, so that the follower fits with the same nicety at all points between the top and bottom.

Attached to the bottom of the kettle, and projecting vertically upward, are guides, C, in which slides a rod, D, having gear-teeth formed on one edge.

The upper ends of the guides C are supported by a suitable brace, c.

Attached to the lower end of the rod D is the mixer, E, which consists of a circular metallic plate, with curved arms, extending from the center to the circumference, and, in appearance, somewhat resembling a wheel.

The cover or follower consists of a circular iron plate, F, with an opening in the center, to allow it to slide freely on the guides C and rod D.

Attached to the top of the kettle, a suitable distance from the brace c, are two standards, T, in which is journaled a shaft, S, on one end of which is a crank, and about midway between the standards is a gear-wheel, G, so arranged as to engage with the rack on the edge of the rod D.

Near the bottom of the kettle is an opening, which, when the kettle is in place, communicates with a spout, a, through the opening in the furnace. This opening may be provided with a valve, or other suitable means for closing it.

The metal to be melted is placed in the kettle, and the follower F placed so as to rest on the metal. As the metal reaches the liquid state the mixer E is forced down, and the follower F allowed to float on the top of the liquid metal. As the follower does not fit the kettle perfectly air-tight, any gas which may be generated in the kettle will readily escape around the edge of the follower; but, at the same time, the follower fits the kettle closely enough to prevent the atmosphere from coming in contact with and oxidizing the metal.

By raising and lowering the rod D the metal can be stirred and thoroughly mixed without disturbing the follower.

This kettle can be used for melting any of the soft metals, but it is peculiarly adapted to the manufacture of "soft solder," where the use of different metals renders it necessary to frequently stir and thoroughly mix the liquid metal, and, where considerable loss results from oxidization, consequent upon exposure to the atmosphere.

In ordinary kettles a cover may be used to exclude the air, but, on raising the cover to stir the metal, it becomes exposed to the action of the atmosphere, and oxidization immediately takes place.

In my invention the metal is kept constantly protected from the atmosphere by means of the follower, which need not be raised at all while there is any metal in the kettle, and the different ingredients are thoroughly mixed and incoporated together by means of the stirring apparatus, the melted metal being drawn off through the opening near the bottom of the kettle and furnace, and conducted by the spout a into molds placed for its reception.

In establishments where the kettle and apurtenances are of unusually large dimensions, the rack and gear-wheel for operating the mixer may be dispensed with, and, in lieu thereof, a chain may be attached to the upper end of the rod D, and, passing over pulleys, have a weight at the end.

By this arrangement the person engaged in stirring the metal can be stationed at any desired distance from the furnace; or, where the kettle is so large as to require the stirring to be done by machinery, one end of a lever may be attached to the rod D, and the other end connected with a working-beam or crank-wheel.

Having described my invention,

What I claim as new, and desire to secure by letters Patent, is—

1. A kettle for melting metals, constructed as described, provided with a follower for the exclusion of atmospheric air, substantially as shown.

2. A kettle for melting and mixing metals, provided with a stirring apparatus, as described, by means of which the liquid metal can be stirred and thoroughly mixed without exposure to the atmosphere, substantially as shown.

2. A kettle for melting, mixing, and casting metals, arranged as described, with relation to the furnace, whereby the melted metal can be drawn off from the bottom, substantially as shown.

W. S. DEEDS.

Witnesses:
E. R. BROWN,
JOHN H. BAER.